United States Patent
Poteet et al.

(10) Patent No.: US 6,750,557 B2
(45) Date of Patent: Jun. 15, 2004

(54) REDUNDANT PRIME MOVER SYSTEM

(75) Inventors: Darrell Poteet, Houston, TX (US); Kelcy Lee Warren, Dallas, TX (US)

(73) Assignee: Energy Transfer Group, L.L.C., Dallas, TX (US)

( * ) Notice: Subject to any disclaimer, the term of this patent is extended or adjusted under 35 U.S.C. 154(b) by 294 days.

(21) Appl. No.: 09/947,728

(22) Filed: Sep. 6, 2001

(65) Prior Publication Data

US 2003/0052485 A1 Mar. 20, 2003

(51) Int. Cl.⁷ .............................. F01D 15/10; F02C 6/00; H02K 7/18; H02P 9/04
(52) U.S. Cl. .................................................... 290/52
(58) Field of Search ............................ 290/52; 417/319

(56) References Cited

U.S. PATENT DOCUMENTS

| | | | |
|---|---|---|---|
| 3,866,108 A | 2/1975 | Yamone et al. | |
| 3,943,374 A | * 3/1976 | Clements | 290/52 |
| 4,077,748 A | 3/1978 | Pötz | 417/319 |
| 4,305,254 A | * 12/1981 | Kawakatsu et al. | 60/716 |
| 4,441,028 A | 4/1984 | Lundberg | 290/52 |
| 4,802,100 A | 1/1989 | Aasen et al. | |
| 5,323,613 A | * 6/1994 | Akiyama | 60/608 |
| 5,416,398 A | 5/1995 | Blatter | |
| 5,635,768 A | 6/1997 | Birch et al. | |
| 5,689,141 A | * 11/1997 | Kikkawa et al. | 290/52 |
| 5,856,709 A | * 1/1999 | Ibaraki et al. | 290/45 |
| 5,899,085 A | * 5/1999 | Williams | 62/236 |
| 6,007,227 A | 12/1999 | Carlson | |
| 6,093,975 A | 7/2000 | Peticolas | |
| 6,099,265 A | * 8/2000 | Rowe et al. | 417/313 |
| 6,230,507 B1 | 5/2001 | Ban et al. | 62/228.4 |
| 6,313,544 B1 | * 11/2001 | Mongia et al. | 290/52 |
| 6,380,637 B1 | * 4/2002 | Hsu et al. | 290/1 R |
| 6,396,165 B1 | * 5/2002 | Nagano et al. | 307/10.6 |
| 6,408,625 B1 | * 6/2002 | Woon et al. | 60/608 |
| 6,410,992 B1 | 6/2002 | Wall et al. | |
| 6,490,506 B1 | * 12/2002 | March | 700/286 |
| 6,512,305 B1 | * 1/2003 | Pinkerton et al. | 290/52 |
| 6,570,265 B1 | * 5/2003 | Shiraishi et al. | 290/40 C |
| 2002/0163200 A1 | * 11/2002 | Oglesby et al. | 290/52 |
| 2003/0060907 A1 | * 3/2003 | Poteet et al. | 700/75 |

FOREIGN PATENT DOCUMENTS

GB          2076897 A   *  3/1981

* cited by examiner

Primary Examiner—Nicholas Ponomarenko
Assistant Examiner—Julio C. Gonzalez
(74) Attorney, Agent, or Firm—Daniel J. Chalker; Chalker Flores, LLP (57) ABSTRACT

The present invention provides a redundant prime mover system to drive a machine having an engine coupled to the machine, and a motor/generator coupled to the machine and an electrical network connection. The engine and the motor/generator have three or four operating modes. The first operating mode drives the machine with the engine. The second operating mode drives the machine with the motor/generator. The third operating mode drives the machine and the motor/generator with the engine such that the motor/generator generates electricity for delivery to the electrical network connection. Alternatively, the third operating mode drives the machine with both the engine and the motor/generator. This alternate operating mode can also be included as a fourth operating mode.

99 Claims, 8 Drawing Sheets

REDUNDANT PRIME MOVER SYSTEM

FIELD OF THE INVENTION

The present invention relates generally to the field of prime mover systems and, more particularly, to a redundant prime mover system.

BACKGROUND OF THE INVENTION

Large shaft driven machines, such as compressors or pumps, are typically driven by a single prime mover, such as an electric motor or engine. For example, compressors on natural gas pipelines are typically driven by an engine or turbine that burns natural gas from the pipeline. In locations where electricity is readily available, the compressor may be driven by an electric motor.

Motor/generators have been added to engine or turbine driven compressors to generate startup torque and to generate electricity from the excess output power generated by the engine or turbine when the power requirement of the compressor is less than the output power generated by the engine or turbine. Such a system is designed to continuously operate the engine or turbine at an optimal level during all seasons no matter what the power requirement of the compressor is. As a result, this system is not designed to selectively run the compressor in more than two operating modes. Moreover, the system is not designed to generate and sell electricity back to the electric utility.

Another system uses a hydraulic turbine, motor/generator and pump combination wherein the motor/generator drives the pump to pump water into a reservoir in one mode and when the water is removed from the reservoir, the water drives the hydraulic turbine which drives the motor/generator to generate electricity. Similarly, a gas turbine, motor/generator and compressor combination has been used in a two operating mode system. The gas turbine drives the motor/generator to generate electricity when the compressor is not used, and the motor/generator drives the compressor when the gas turbine is not used. These systems are not designed to selectively run the compressor in more than two operating modes depending on various parameters.

Accordingly, there is a need for a redundant prime mover system that provides increased reliability, versatility and efficiency.

SUMMARY OF THE INVENTION

The present invention provides a redundant prime mover system that can be operated in three or four different operating modes, which increases the reliability, versatility and efficiency of the system. The present invention includes an engine or turbine, a motor/generator and a machine, such as a compressor or pump. The four different operating modes are: driving the machine with the engine or turbine; driving the machine with the motor/generator; driving the machine and the motor/generator with the engine or turbine such that the motor/generator generates electricity; and driving the machine with both the engine or turbine and the motor/generator in a load sharing arrangement. The system can be selectively switched between these modes depending on one or more parameters. As a result, the present invention can be set to run in the most cost effective mode or can arbitrage the price differences between electricity and the fuel used by the engine.

The present invention provides a redundant prime mover system to drive a machine having an engine coupled to the machine, a motor/generator coupled to the machine and an electrical network connection, and a controller communicably coupled to the engine and the motor/generator. The controller has at least three operating modes. The first operating mode drives the machine with the engine. The second operating mode drives the machine with the motor/generator. The third operating mode drives the machine and the motor/generator with the engine such that the motor/generator generates electricity for delivery to the electrical network connection. Alternatively, the third operating mode drives the machine with both the engine and the motor/generator. This alternate operating mode can also be included as a fourth operating mode.

In addition, the present invention provides a redundant prime mover system to drive a machine having a motor/generator coupled to the machine and an electrical network connection, an engine coupled to the motor/generator, and a controller communicably coupled to the engine and the motor/generator. The controller has at least three operating modes. The first operating mode drives the machine with the engine. The second operating mode drives the machine with the motor/generator. The third operating mode drives the machine and the motor/generator with the engine such that the motor/generator generates electricity for delivery to the electrical network connection. Alternatively, the third operating mode drives the machine with both the engine and the motor/generator. This alternate operating mode can also be included as a fourth operating mode.

BRIEF DESCRIPTION OF THE DRAWINGS

The above and further advantages of the invention may be better understood by referring to the following description in conjunction with the accompanying drawings, in which.

DETAILED DESCRIPTION OF THE INVENTION

While the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention and do not delimit the scope of the invention. Although the present invention will be described in reference to a dual drive compressor system, the present invention is applicable to any system for driving a machine, such as a compressor or pump, with an engine, or turbine, and a motor/generator.

The present invention provides a redundant prime mover system that can be operated in three or four different operating modes, which increases the reliability, versatility and efficiency of the system. The present invention includes an engine or turbine, a motor/generator and a machine, such as a compressor or pump. The four different operating modes are: driving the machine with the engine or turbine; driving the machine with the motor/generator; driving the machine and the motor/generator with the engine or turbine such that the motor/generator generates electricity; and driving the machine with both the engine or turbine and the motor/generator in a load sharing arrangement. The system can be selectively switched between these modes depending on one or more parameters. As a result, the present invention can be set to run in the most cost effective mode or can arbitrage the price differences between electricity and the fuel used by the engine.

Figure 1:
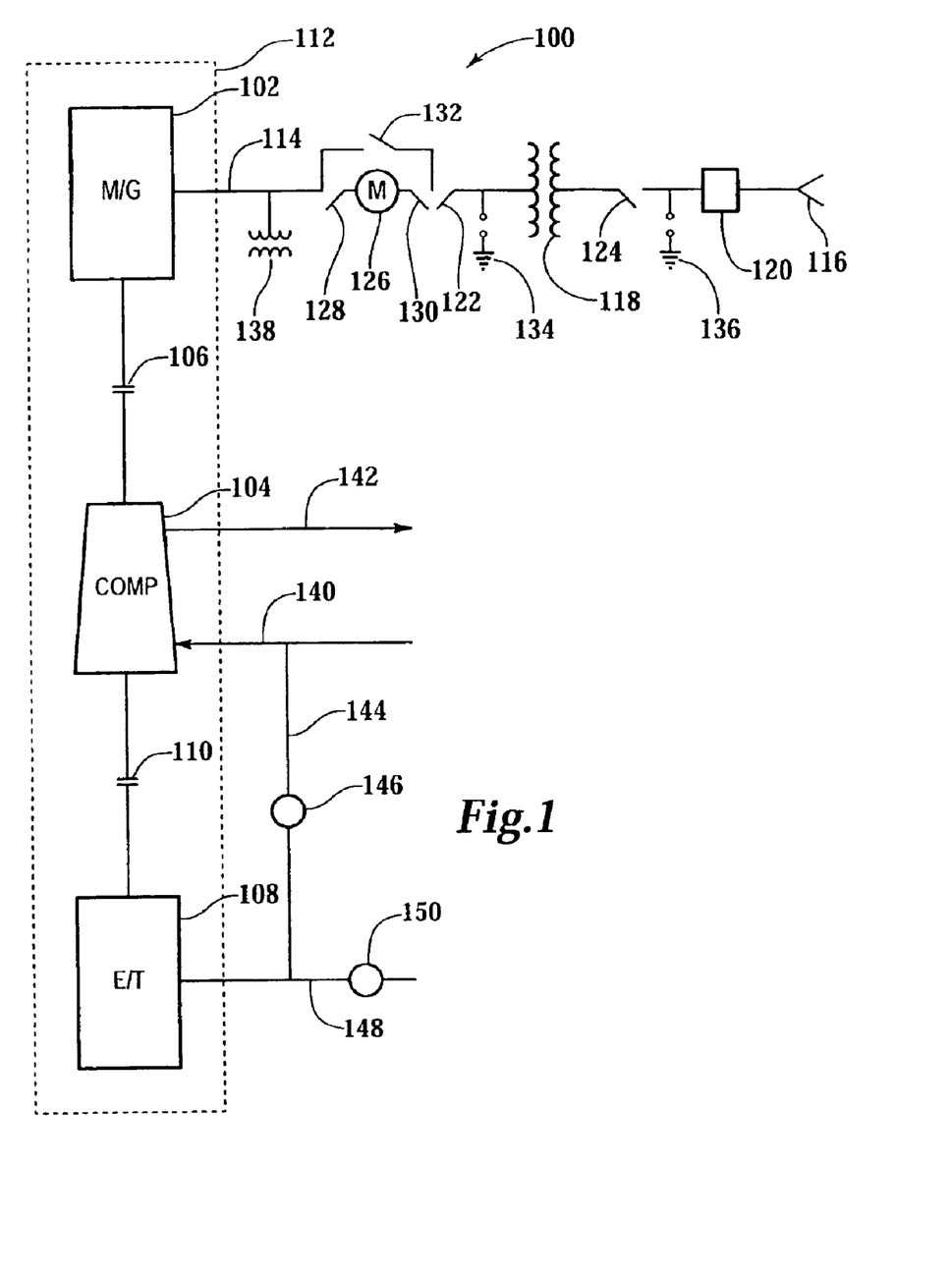
FIG. 1 is a block diagram of a redundant prime mover system in accordance with one embodiment of the present invention.

FIG. 1 is a block diagram of a redundant prime mover system 100 in accordance with one embodiment of the present invention. The redundant prime mover system 100 includes a motor/generator 102 coupled to a compressor 104 with a first coupling 106 (also referred to as the "M/G-COMP Coupling") and a engine or turbine 108 coupled to the compressor 104 with a second coupling 110 (also referred to as the "E/T-COMP Coupling"). Couplings 106 and 110 can be a clutch, magnetic coupling, gearbox or other suitable device to selectively engage/disengage the shaft of the compressor or pump 104. The engine 108 can be a variable speed engine. In one embodiment of the present invention, the engine 108 is oversized so that some amount of electricity can be generated using the motor/generator 102 even with the compressor 104 is operating at peak load. In small to medium applications, the motor/generator 102, compressor 104 and engine or turbine 108 are typically mounted on a skid 112 to form a package that can be transported and set up more quickly and economically than individually installing components 102, 104, 106, 108 and 110 in the field. As will be appreciated by those skilled in the art, other equipment (not shown), such as coolers, cooler drivers, scrubbers and application specific devices, may be connected to the motor/generator 102, compressor 104 or engine 108.

The motor/generator 102 is electrically connected to an electrical network connection 114, which is used as a source of electricity to run the motor/generator 102 and drive the compressor 104 and a delivery point for the electricity generated by the motor/generator 102 when the engine 108 is supplying more output power than is required to drive the compressor 104. The exact interface between the electrical network connection 114 and the transmission or distribution system 116 will vary from one installation to another. One possible interface may include a step-down/step-up transformer 118 connected to the transmission or distribution system line 116 via breaker 120. The step-down/step-up transformer 118 can be isolated with switches 122 and 124. A meter 126 records the energy flow to and from the step-down/set-up transformer 118. Meter 126 is connected between the step-down/step-up transformer 118 and the electrical network connection 114, and may be isolated with switches 128 and 130 or bypassed with switch 132. Other metering and protective devices may also be used, such as protective relays (not shown), lightning arrestors 134 and 136, potential transformers 138, etc.

Although a compressor 104 is depicted, compressor 104 could also be a pump or other machine that is driven by large engines, turbines or motors. Input line 140 and output line 142 are connected to compressor 104. As will be appreciated by those skilled in the art, the connection of the lines 140 and 142 to the compressor 104 will also include various valves, regulators and other flow protection/regulation devices. These lines 140 and 142 may be taps off of a pipeline, such as natural gas or other petroleum product, or part of a processing plant. If input line 140 contains a product that can be used as fuel for the engine or turbine 108, a first fuel supply line 144 having a regulating valve 146 will connect the input line 140 to the engine or turbine 108. In such cases, first fuel supply line 144 will serve as the primary fuel supply for the engine or turbine 108. A second fuel supply line 148 having a regulating valve 150 will typically connect the engine or turbine 108 to an alternate fuel supply. If input line 140 does not contains a product that can be used as fuel for the engine or turbine 108, second fuel supply line 148 will be the primary source of fuel to the engine or turbine 108.

Figure 2:
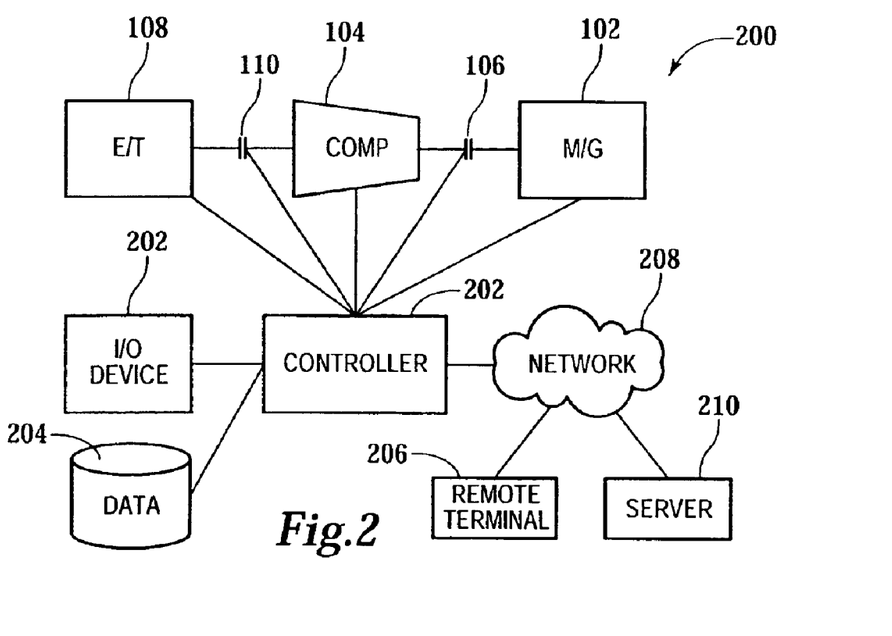
FIG. 2 is a block diagram of a control system for a redundant prime mover system in accordance with one embodiment of the present invention.

Now referring to FIG. 2, a block diagram of a control system 200 for a redundant prime mover system in accordance with one embodiment of the present invention is shown. A controller 202 is communicably coupled to the engine or turbine 108, the second coupling 110, the compressor 104, the first coupling 106 and the motor/generator 102. The controller 202 monitors and controls the operation of these components 102, 104, 106, 108 and 110. The controller 202 can be installed on the skid 112 (FIG. 1) or in a remotely located control room or building (not shown). The controller 202 may also be communicably coupled to one or more input/output ("I/O") devices 202 and data storage devices 204. The system 200 can be controlled and monitored from the controller 202 or from a remote terminal 206 communicably coupled to the controller 202 via a network 208 or a direct communication link (not shown). The controller 202 can also send and retrieve data or commands from a remote server 210 communicably coupled to the controller 202 via network 208.

Figure 3:
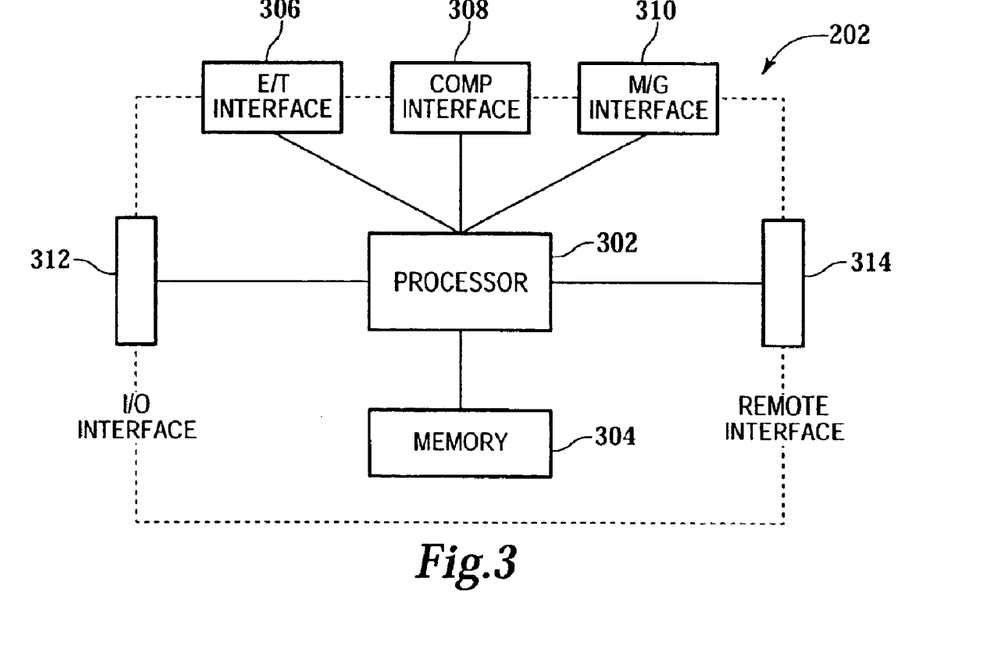
FIG. 3 is a block diagram of a controller for a redundant prime mover system in accordance with one embodiment of the present invention.

Referring now to FIG. 3, a block diagram of a controller 202 for a redundant prime mover system in accordance with one embodiment of the present invention is shown. The controller 202 includes one or more processors 302 communicably coupled to a memory 304. Memory 304 can be read only memory ("ROM") and/or random access memory ("RAM"). The one or more processors 302 are communicably coupled to a engine control interface 306, a compressor control interface 308, a motor/generator control interface 310, an I/O interface 312 and a remote interface 314. The controller 202 controls and monitors the engine or turbine 108 (FIG. 2) using the engine control interface 306. The second coupling 110 (FIG. 2) can be controlled and monitored using engine control interface 306, the compressor interface 308 or a separate interface (not shown). Similarly, the controller 202 controls and monitors the motor/generator 102 (FIG. 2) using the motor/generator control interface 310. The first coupling 106 (FIG. 2) can be controlled and monitored using motor/generator control interface 310, the compressor interface 308 or a separate interface (not shown). The controller 202 controls and monitors the compressor 104 (FIG. 2) using the compressor control interface 308. Note that some or all of these three interfaces 306, 308 and 310 can be combined into a single interface. Moreover, each interface 306, 308 and 310 can be individually wired connections. The I/O interface 312 communicably couples the processor 320 to the I/O devices 202 (FIG. 2) and data storage devices 204 (FIG. 2). Similarly, the remote interface 314 communicably couples the processor 320 to the remote terminal 206 (FIG. 2) and data server 210 (FIG. 2). The I/O interface 312 and remote interface 314 can be a serial, parallel, universal serial bus ("USB"), Ethernet, telephone or other type of computer interface. As will be appreciated by those skilled in the art, the interfaces 306, 308, 310, 312 and 314 include the necessary hardware, software and drivers to establish communication between the processor and the connected devices.

Figure 4A:
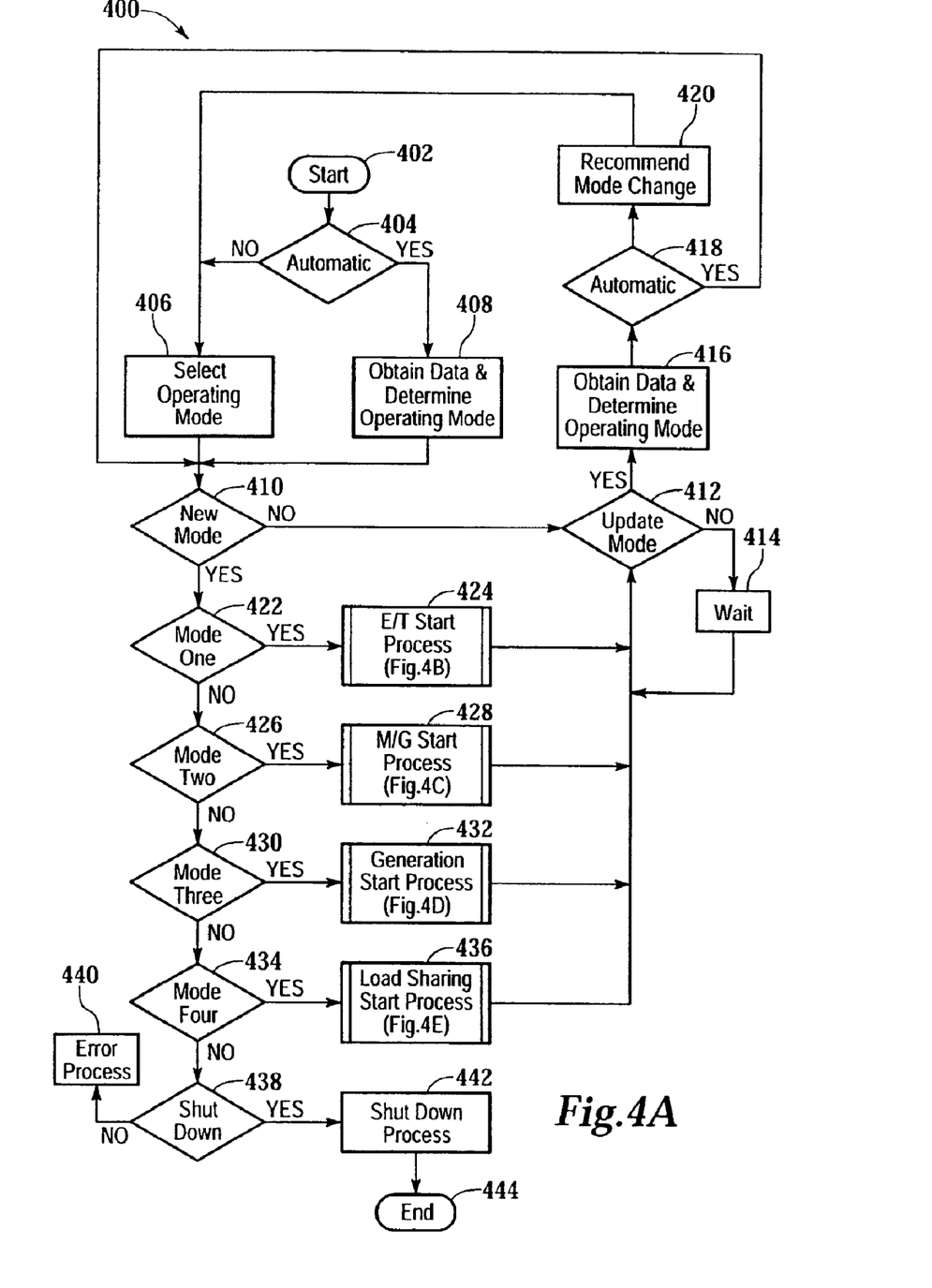
FIGS. 4A, 4B, 4C, 4D and 4E are flowcharts of a control process for a redundant prime mover system in accordance with one embodiment of the present invention.

Now referring to FIG. 4A, a flowchart of a control process 400 for a redundant prime mover system in accordance with one embodiment of the present invention is shown. The control process 402 starts in block 402 and the system determines whether it is in manual or automatic mode in decision block 404. If the system is not in automatic mode, as determined in decision block 404, an operating mode is selected in block 406. If the system is in automatic mode, as determined in decision block 404, one or more parameters, such as operational data, are obtained and the proper operating mode is determined in block 408. The one or more parameters may include an estimated operational cost for the engine, an estimated operational cost for the motor/generator, a selling price for electricity, a fuel cost for the engine, an electricity cost for the motor/generator, a time period, an emission limit, an audible noise limit, or any other operational data.

Once the operating mode has been selected or determined in either block 406 or block 408, and if the operating mode is new (initial operating mode or different from the current operating mode), as determined in decision block 410, and if it is not time to re-determine the operating mode, as determined in decision block 412, the system waits a predetermined amount of time in block 414 before it re-determines the operating mode. If, however, it is time to re-determined the operating mode, as determined in decision block 412, operating data is obtained and the proper operating mode is determined in block 416. If the system is set to automatic, as determined in decision block 418, the process loops back to decision block 410 to determine whether the re-determined operating mode is new. If, however, the system is not set to automatic, as determined in decision block 418, the system recommends that the operating mode be changed in block 420 and then loops back to block 406 where the operating mode is selected. If a new operating mode is not selected in block 406, the re-determination process can be repeated.

The control process 400 of the present invention operates the motor/generator 102 (FIGS. 1 and 2), compressor 104 (FIGS. 1 and 2) and engine 108 (FIGS. 1 and 2) in three or four operating modes. The operating modes can be selected manually or automatically. The first operating mode drives the machine with the engine. The second operating mode drives the machine with the motor/generator. The third operating mode drives the machine and the motor/generator with the engine such that the motor/generator generates electricity for delivery to the electrical network connection. Alternatively, the third operating mode drives the machine with both the engine and the motor/generator. This alternate operating mode can also be included as a fourth operating mode.

For example, the present invention can be set to operate in the most cost efficient manner using three operating modes based on these parameters: a first estimated operational cost for the engine, a second estimated operational cost for the engine, an estimated operational cost for the motor/generator and a selling price for the electricity. The first estimated operational cost for the engine corresponds to the operating costs to drive the compressor 104 (FIGS. 1 and 2) with the engine 108 (FIGS. 1 and 2). The second estimated operational cost for the engine corresponds to the incremental cost to drive the compressor 104 (FIGS. 1 and 2) and the motor/generator 102 (FIGS. 1 and 2). The first operating mode occurs whenever a first estimated operational cost for the engine 108 (FIGS. 1 and 2) is less than an estimated operational cost for the motor/generator 102 (FIGS. 1 and 2). The second operating mode occurs whenever an estimated operational cost for the motor/generator 102 (FIGS. 1 and 2) is less than or equal to the first estimated operational cost for the engine 108 (FIGS. 1 and 2). The third operating mode occurs whenever a selling price for the electricity is greater than the second estimated operational cost for the engine 108 (FIGS. 1 and 2). The processor 302 (FIG. 3) can calculate the first operational cost for the engine 108 (FIGS. 1 and 2), second operational cost for the engine 108 (FIGS. 1 and 2), operational cost for the motor/generator 102 (FIGS. 1 and 2) and selling price for the electricity using current and/or historical data. These operating modes can be manually controlled, preprogrammed, or determined in real-time, near real-time or from historical and/or projected data. For example, the operating modes could be triggered by selected time periods to operate in the first operating mode during the summer months (excluding electrical peaking periods), the second operating mode during the remaining months, and the third operating mode during the electrical peaking periods.

If the operating mode is new (initial operating mode or different from the current operating mode), as determined in decision block 410, and the new operating mode is the first operating mode, as determined in decision block 422, the E/T start process is executed in block 424. The E/T start process 424 is described below in reference to FIG. 4B. After completion of the E/T start process in block 424, the process loops back to decision block 412 to determine whether it is time to re-determine or update the operating mode. If, however, the new operating mode is not the first operating mode, as determined in decision block 422, and the new operating mode is the second operating mode, as determined in decision block 426, the M/G start process is executed in block 428. The M/G start process 428 is described below in reference to FIG. 4C. After completion of the M/G start process in block 428, the process loops back to decision block 412 to determine whether it is time to re-determine or update the operating mode. If, however, the new operating mode is not the second operating mode, as determined in decision block 426, and the new operating mode is the third operating mode, as determined in decision block 430, the generation start process is executed in block 432. The generation start process 432 is described below in reference to FIG. 4D. After completion of the generation start process in block 432, the process loops back to decision block 412 to determine whether it is time to re-determine or update the operating mode. If, however, the new operating mode is not the third operating mode, as determined in decision block 430, and the new operating mode is the fourth operating mode, as determined in decision block 434, the load sharing start process is executed in block 436. The load sharing start process 436 is described below in reference to FIG. 4E. After completion of the load sharing start process in block 436, the process loops back to decision block 412 to determine whether it is time to re-determine or update the operating mode. If, however, the new operating mode is not the fourth operating mode, as determined in decision block 434, and the shut down process has not been ordered, as determined in decision block 438, a error process will commence in block 440. The error process 440 may include various system checks, diagnostics and reporting functions, and may or may not initiate a shut down process or "safe"

operating mode. If, however, the shut down process has been ordered, as determined in decision block 438, the shut down process will be executed in block 442 and the process ends in block 444.

Figure 4B:
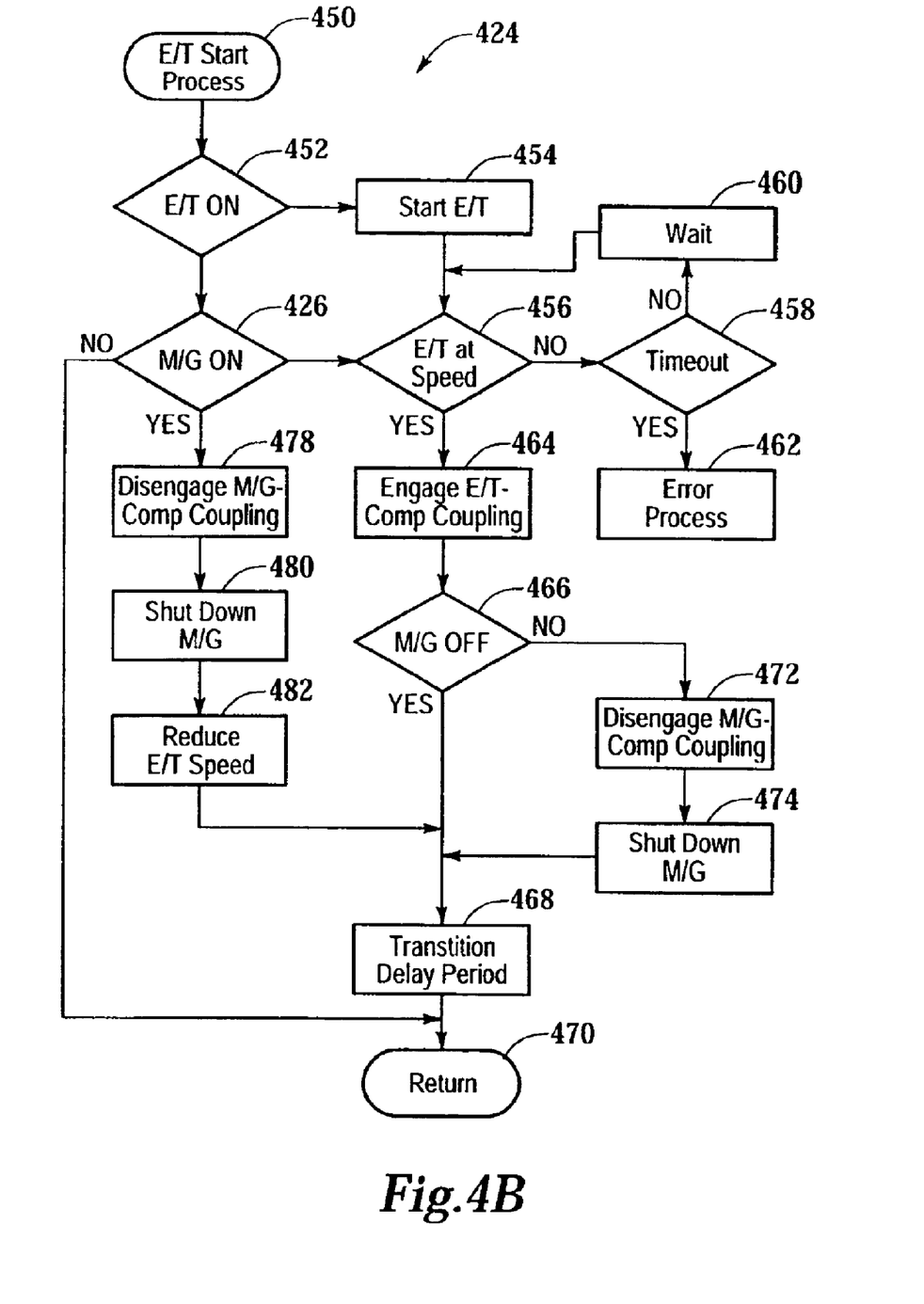

Referring now to FIG. 4B, a flowchart of the engine or turbine start process 424 of FIG. 4A for a redundant prime mover system in accordance with one embodiment of the present invention is shown. The E/T start process 424 begins in block 450. If the engine or turbine 108 (FIG. 1) is not on, as determined in decision block 452, the engine or turbine 108 (FIG. 1) is started in block 454. If the engine or turbine 108 (FIG. 1) is not up to the proper speed to engage the E/T-COMP coupling 110 (FIG. 1), as determined in decision block 456, and the start process has not exceeded a specified period of time ("timed out"), as determined in decision block 458, the process will wait in block 460 for a period of time before the engine or turbine 108 (FIG. 1) speed is checked again in decision block 456. If, however, the start process has timed out, as determined in decision block 458, an error process will be initiated in block 462. The error process 462 may include various system checks, diagnostics and reporting functions. The error process 462 may also shut the engine or turbine 108 (FIG. 1) down and disable the E/T start process 424 and generation start process 432 until a technician services the control system and the engine or turbine 108 (FIG. 1). If the engine or turbine 108 (FIG. 1) is up to the proper speed, as determined in decision block 456, the E/T-COMP coupling 110 (FIG. 1) is engaged in block 464. If the motor/generator 102 (FIG. 1) is not on, as determined in decision block 466, the system suspends further processing until a transition delay period has expired in block 468 and the process returns in block 470. The transition delay period can be a minimum time to run the engine or turbine 108 (FIG. 1) in the first operating mode based on the costs and equipment wear and tear associated with changing operating modes. For example, the system may be specified to prevent changing operating modes every few minutes or even every hour. Alternatively, there may be a maximum number of changes allowed per day, week or month.

If, however, the motor/generator 102 (FIG. 1) is on, as determined in decision block 466, the M/G-COMP coupling 106 (FIG. 1) is disengaged in block 472 and the motor/generator 102 (FIG. 1) is shut down in block 474. As before, the system suspends further processing until the transition delay period has expired in block 468 and returns to the main process (FIG. 4) in block 470. If, however, the engine or turbine 108 (FIG. 1) is on, as determined in decision block 452, and the motor/generator 102 (FIG. 1) is not on, as determined in decision block 476, the process returns in block 470 to the main process (FIG. 4) because the system is already in the first operating mode. If, however, the motor/generator 102 (FIG. 1) is on, as determined in decision block 476, the M/G-COMP coupling 106 (FIG. 1) is disengaged in block 478 and the motor/generator 102 (FIG. 1) is shut down in block 480. The speed of the engine or turbine 108 (FIG. 1) is reduced in block 482 to only drive the compressor instead of both the compressor and motor/generator. The system suspends further processing until the transition delay period has expired in block 468 and returns in block 470 to the main process (FIG. 4).

Figure 4C:
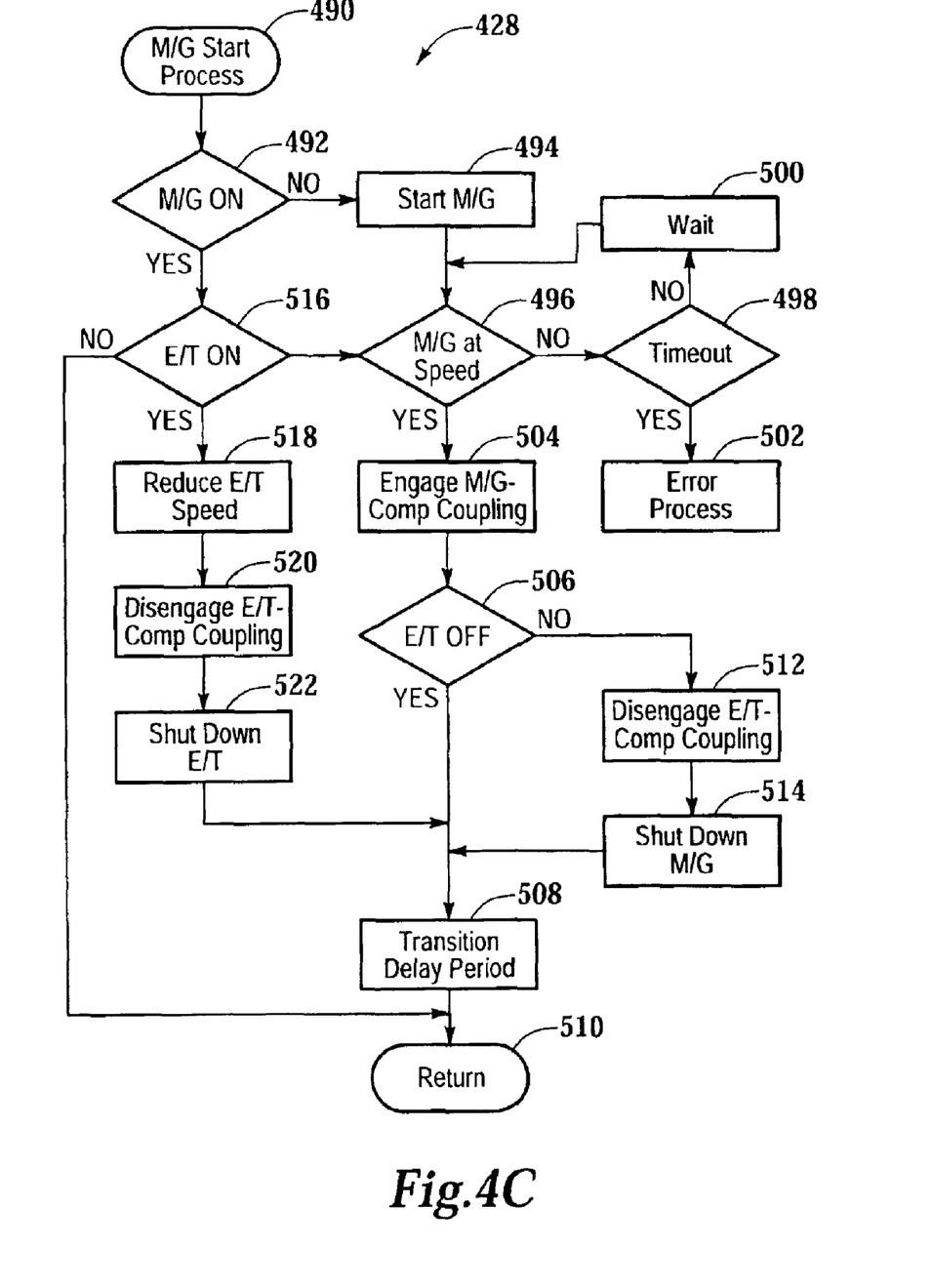

Now referring to FIG. 4C, a flowchart of the motor/generator start process 428 of FIG. 4A for a redundant prime mover system in accordance with one embodiment of the present invention is shown. The M/G start process 428 begins in block 490. If the motor/generator 102 (FIG. 1) is not on, as determined in decision block 492, the motor/generator 102 (FIG. 1) is started in block 494. If the motor/generator 102 (FIG. 1) is not up to the proper speed to engage the M/G-COMP coupling 106 (FIG. 1), as determined in decision block 496, and the start process has not timed out, as determined in decision block 498, the process will wait in block 500 for a period of time before the motor/generator 102 (FIG. 1) speed is checked again in decision block 496. If, however, the start process has timed out, as determined in decision block 498, an error process will be initiated in block 502. The error process 502 may include various system checks, diagnostics and reporting functions. The error process 502 may also shut the motor/generator 102 (FIG. 1) down and disable the M/G start process 428 and generation start process 432 until a technician services the control system and the motor/generator 102 (FIG. 1). If the motor/generator 102 (FIG. 1) is up to the proper speed, as determined in decision block 496, the M/G-COMP coupling 106 (FIG. 1) is engaged in block 504. If the motor/generator 102 (FIG. 1) is not on, as determined in decision block 506, the system suspends further processing until a transition delay period has expired in block 508 and the process returns in block 510. The transition delay period can be a minimum time to run the motor/generator 102 (FIG. 1) in the first operating mode based on the costs and equipment wear and tear associated with changing operating modes. For example, the system may be specified to prevent changing operating modes every few minutes or even every hour. Alternatively, there may be a maximum number of changes allowed per day, week or month.

If, however, the motor/generator 102 (FIG. 1) is on, as determined in decision block 506, the E/T-COMP coupling 110 (FIG. 1) is disengaged in block 512 and the engine or turbine 108 (FIG. 1) is shut down in block 514. As before, the system suspends further processing until the transition delay period has expired in block 508 and returns to the main process (FIG. 4) in block 510. If, however, the motor/generator 102 (FIG. 1) is on, as determined in decision block 492, and the engine or turbine 108 (FIG. 1) is not on, as determined in decision block 516, the process returns in block 510 to the main process (FIG. 4) because the system is already in the second operating mode. If, however, the engine or turbine 108 (FIG. 1) is on, as determined in decision block 516, the speed of the engine or turbine 108 (FIG. 1) is reduced in block 518 so that the system is not generating electricity. The E/T-COMP coupling 110 (FIG. 1) is disengaged in block 520 and the engine or turbine 108 (FIG. 1) is shut down in block 522. The system suspends further processing until the transition delay period has expired in block 508 and returns in block 510 to the main process (FIG. 4).

Figure 4D:
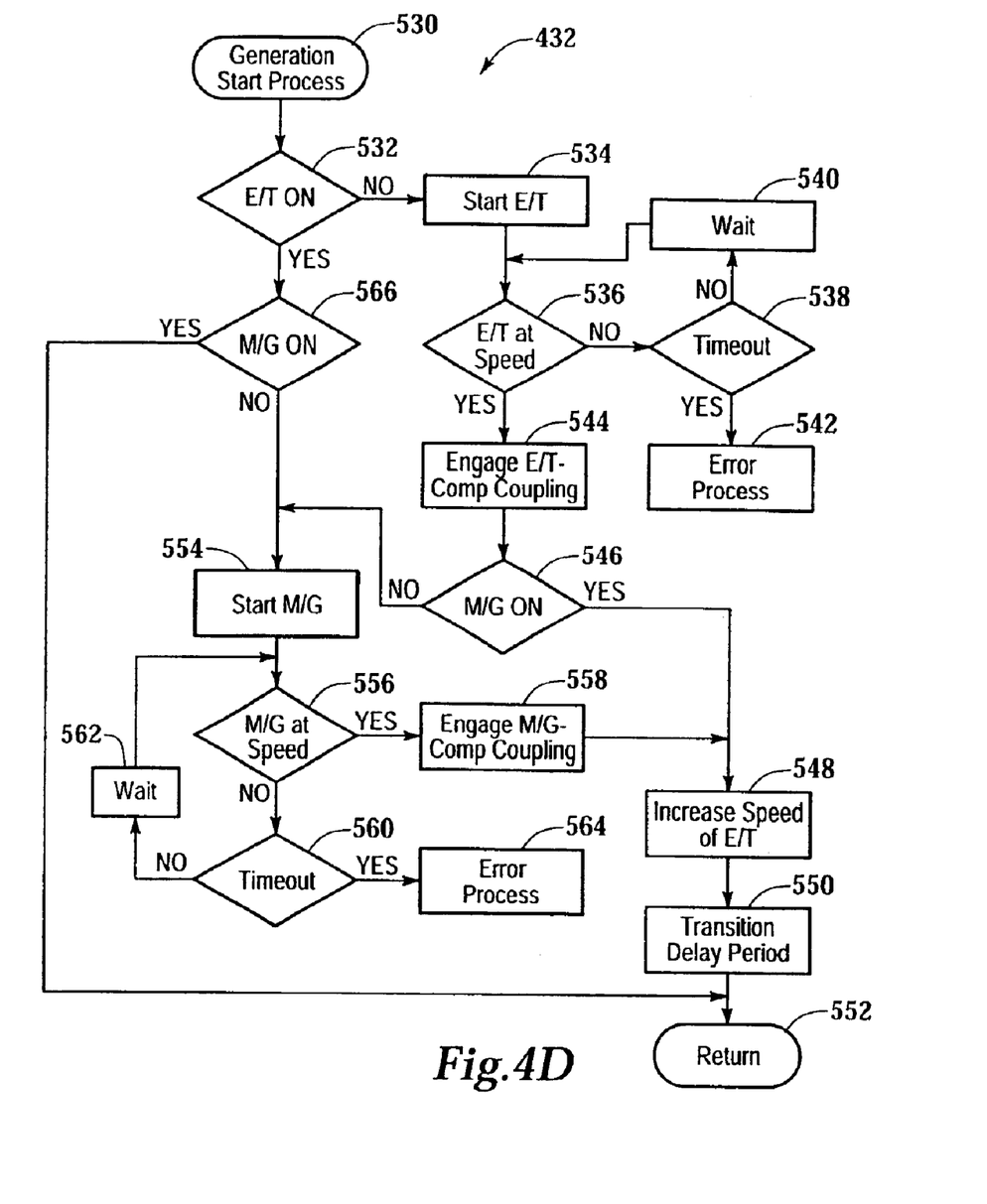

Referring now to FIG. 4D, a flowchart of the generation start process 432 of FIG. 4A for a redundant prime mover system in accordance with one embodiment of the present invention is shown. The generation start process 432 begins in block 530. If the engine or turbine 108 (FIG. 1) is not on, as determined in decision block 532, the engine or turbine 108 (FIG. 1) is started in block 534. If the engine or turbine 108 (FIG. 1) is not up to the proper speed to engage the E/T-COMP coupling 110 (FIG. 1), as determined in decision block 536, and the start process has not timed out, as determined in decision block 538, the process will wait in block 540 for a period of time before the engine or turbine 108 (FIG. 1) speed is checked again in decision block 536. If, however, the start process has timed out, as determined in decision block 538, an error process will be initiated in block 542. The error process 542 may include various system checks, diagnostics and reporting functions. The error process 542 may also shut the engine or turbine 108 (FIG. 1)

down and disable the E/T start process 424, generation start process 432 and load sharing start process 436 until a technician services the control system and the engine or turbine 108 (FIG. 1). If the engine or turbine 108 (FIG. 1) is up to the proper speed, as determined in decision block 536, the E/T-COMP coupling 110 (FIG. 1) is engaged in block 544. If the motor/generator 102 (FIG. 1) is on, as determined in decision block 546, the speed of the engine or turbine 108 (FIG. 1) is increased in block 548 so that the system generates electricity. The system suspends further processing until a transition delay period has expired in block 550 and the process returns in block 552. The transition delay period can be a minimum time to run the motor/generator 102 (FIG. 1) and engine or turbine 108 (FIG. 1) in the third operating mode based on the costs and equipment wear and tear associated with changing operating modes. For example, the system may be specified to prevent changing operating modes every few minutes or even every hour. Alternatively, there may be a maximum number of changes allowed per day, week or month.

If, however, the motor/generator 102 (FIG. 1) is not on, as determined in decision block 546, the motor/generator 102 (FIG. 1) is started in block 554. If the motor/generator 102 (FIG. 1) is up to the proper speed, as determined in decision block 556, the M/G-COMP coupling 106 (FIG. 1) is engaged in block 558 and the speed of the engine or turbine 108 (FIG. 1) is increased in block 548 so that the system generates electricity. The system suspends further processing until a transition delay period has expired in block 550 and the process returns in block 552. If, however, the motor/generator 102 (FIG. 1) is not up to the proper speed to engage the M/G-COMP coupling 106 (FIG. 1), as determined in decision block 556, and the start process has not timed out, as determined in decision block 560, the process will wait in block 562 for a period of time before the motor/generator 102 (FIG. 1) speed is checked again in decision block 556. If, however, the start process has timed out, as determined in decision block 560, an error process will be initiated in block 564. The error process 564 may include various system checks, diagnostics and reporting functions. The error process 564 may also shut the motor/generator 102 (FIG. 1) down and disable the M/G start process 428, generation start process 432 and load sharing start process 436 until a technician services the control system and the motor/generator 102 (FIG. 1).

If, however, the engine or turbine 108 (FIG. 1) is on, as determined in decision block 532, and the motor/generator 102 (FIG. 1) is on, as determined in decision block 566, the process returns in block 552 to the main process (FIG. 4) because the system is already in the third operating mode. If, however, the motor/generator 102 (FIG. 1) is not on, as determined in decision block 566, the motor/generator 102 (FIG. 1) is started in block 554 and the process continues as previously described.

Figure 4E:
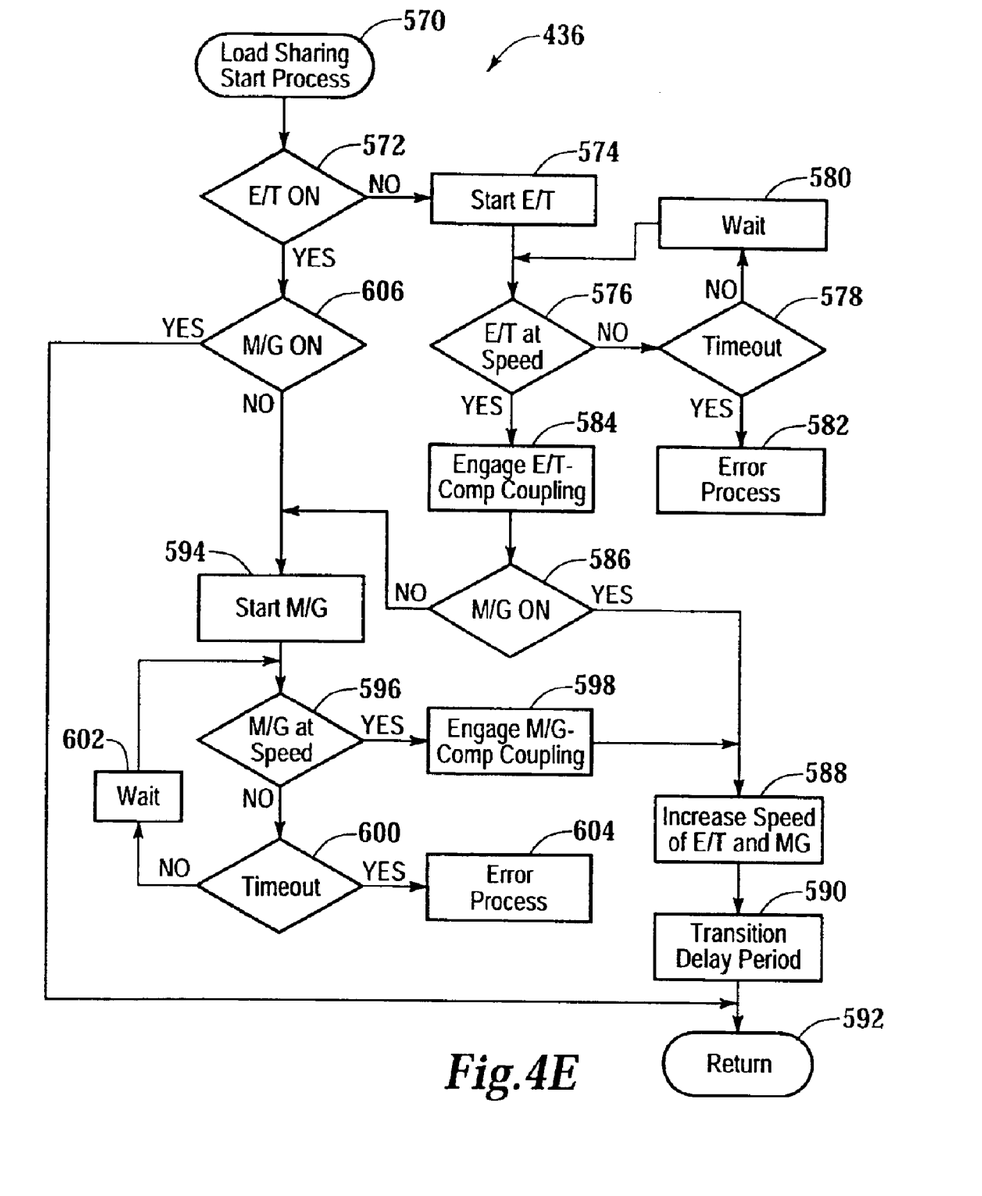

Referring now to FIG. 4E, a flowchart of the load sharing start process 436 of FIG. 4A for a redundant prime mover system in accordance with one embodiment of the present invention is shown. The load sharing start process 436 begins in block 570. If the engine or turbine 108 (FIG. 1) is not on, as determined in decision block 572, the engine or turbine 108 (FIG. 1) is started in block 574. If the engine or turbine 108 (FIG. 1) is not up to the proper speed to engage the E/T-COMP coupling 110 (FIG. 1), as determined in decision block 576, and the start process has not timed out, as determined in decision block 578, the process will wait in block 580 for a period of time before the engine or turbine 108 (FIG. 1) speed is checked again in decision block 576. If, however, the start process has timed out, as determined in decision block 578, an error process will be initiated in block 582. The error process 582 may include various system checks, diagnostics and reporting functions. The error process 582 may also shut the engine or turbine 108 (FIG. 1) down and disable the E/T start process 424, generation start process 432 and load sharing start process 436 until a technician services the control system and the engine or turbine 108 (FIG. 1). If the engine or turbine 108 (FIG. 1) is up to the proper speed, as determined in decision block 576, the E/T-COMP coupling 110 (FIG. 1) is engaged in block 584. If the motor/generator 102 (FIG. 1) is on, as determined in decision block 586, the output of the engine or turbine 108 (FIG. 1) and motor/generator 102 (FIG. 1) are adjusted to share the load of the compressor 104 in block 588. The system suspends further processing until a transition delay period has expired in block 590 and the process returns in block 592. The transition delay period can be a minimum time to run the motor/generator 102 (FIG. 1) and engine or turbine 108 (FIG. 1) in the fourth operating mode based on the costs and equipment wear and tear associated with changing operating modes. For example, the system may be specified to prevent changing operating modes every few minutes or even every hour. Alternatively, there may be a maximum number of changes allowed per day, week or month.

If, however, the motor/generator 102 (FIG. 1) is not on, as determined in decision block 586, the motor/generator 102 (FIG. 1) is started in block 594. If the motor/generator 102 (FIG. 1) is up to the proper speed, as determined in decision block 596, the M/G-COMP coupling 106 (FIG. 1) is engaged in block 598 and the speed of the engine or turbine 108 (FIG. 1) and motor/generator 102 (FIG. 1) are adjusted to share the load of the compressor 104 in block 588. The system suspends further processing until a transition delay period has expired in block 590 and the process returns in block 592. If, however, the motor/generator 102 (FIG. 1) is not up to the proper speed to engage the M/G-COMP coupling 106 (FIG. 1), as determined in decision block 596, and the start process has not timed out, as determined in decision block 600, the process will wait in block 602 for a period of time before the motor/generator 102 (FIG. 1) speed is checked again in decision block 596. If, however, the start process has timed out, as determined in decision block 600, an error process will be initiated in block 604. The error process 604 may include various system checks, diagnostics and reporting functions. The error process 604 may also shut the motor/generator 102 (FIG. 1) down and disable the M/G start process 428, generation start process 432 and load sharing start process 436 until a technician services the control system and the motor/generator 102 (FIG. 1).

If, however, the engine or turbine 108 (FIG. 1) is on, as determined in decision block 572, and the motor/generator 102 (FIG. 1) is on, as determined in decision block 606, the process returns in block 592 to the main process (FIG. 4) because the system is already in the third operating mode. If, however, the motor/generator 102 (FIG. 1) is not on, as determined in decision block 606, the motor/generator 102 (FIG. 1) is started in block 574 and the process continues as previously described.

The following data illustrates an example of some of the equipment that can be used to implement the present invention. The applicable data for compressor 654 is:

| Manufacturer: ARIEL | | Model: JGT-4 | |
|---|---|---|---|
| Configuration: | | | |
| No. of Throws: | | FOUR | |
| No. of Stages: | | ONE | |
| Speed Range Min/Max. RPM: 750/1500 | | Design Speed: 1400/1180 | |
| Piston Speed - FPM: 1050/885 | | | |
| Elevat'n Ft: 1000 | Barmtr Psia: 14.165 | Amb'nt Degf: 100 | |
| Compressor Data: | | Driver Data: | |
| Frame Model: Jgt/4 | Stroke Inch: 4.500 | Rod Dia Inch: 2.000 | Type: Gas Engine |
| Max R1 #Tot: 74000 | Max R1 #Tens: 37000 | Max R1 #Comp: 40000 | Mfr: Caterpillar |
| Rated Rpm: 1500 | Rated Bhp: 2600 | Rated Ps Fpm: 1125 | Model: 3516 tale |
| Calc Rpm: 1400 | Calc Bhp: 1150 | Calc Ps Fpm: 1050 | Bhp: 1265 (Cont) |
| Services | | Gathering | |
| Stage Data: | | Stage 1 | |
| Flow Req'd Mmscfd | | 15.000 | |
| Flow Calc Mmscfd | | 13.991 | |
| Cyl Hp Per Stage | | 1131.2 | |
| Specific Gravity | | 0.6500 | |
| Ratio Of Sp Ht 'N' | | 1.2620 | |
| Comprsblty Suc Zs | | 0.9558 | |
| Comprsblty Dch Zd | | 0.9539 | |
| Pres Suc Line Psig | | 250.00 | |
| Pres Suc Flg Psig | | 247.50 | |
| Pres Dch Flg Psig | | 959.50 | |
| Pres Dch Line Psig | | 950.0 | |
| Pres Ratio F/F | | 3.7210 | |
| TEMP SUC Degf | | 80.0 | |
| TEMP CLF DCH Degf | | 120.0 | |

| Cylinder Data: | Throw 1 | Throw 2 | Throw 3 | Throw 4 |
|---|---|---|---|---|
| Cylinder Model | 7-1/4t | 7-1/4t | 7-1/4t | 7-1/4t |
| Cylinder Bore Inch | 7.250 | 7.250 | 7.250 | 7.250 |
| Cyl Rdp (Api) Psig | 1727.0 | 1727.0 | 1727.0 | 1727.0 |
| Cylinder Mawp Psig | 1900.0 | 1900.0 | 1900.0 | 1900.0 |
| Cylinder Action | Dbl | Dbl | Dbl | Dbl |
| Cylinder Disp Cfm | 289.564 | 289.564 | 289.564 | 289.564 |
| Pres Suc Intl Psig | 226.98 | 226.98 | 226.98 | 226.98 |
| TEMP SUC INTL Degf | 86.97 | 86.97 | 86.97 | 86.97 |
| Cmprsb'y Suc Zsph | 0.9576 | 0.9576 | 0.9576 | 0.9576 |
| Pres Dch Intl Psig | 1035.46 | 1035.46 | 1035.46 | 1035.46 |
| TEMP DCH INTL Degf | 281.98 | 281.98 | 281.98 | 281.98 |
| He Suc Gas Vel Fpm | 9267 | 9267 | 9267 | 9267 |
| He Dch Gas Vel Fpm | 8957 | 8957 | 8957 | 8957 |
| He Spacrs Used/Max | 0/4 | 0/4 | 0/4 | 0/4 |
| He Vvpkt % Cl Avail | 0.9 + 52.4 | 0.9 + 52.4 | 0.9 + 52.4 | 0.9 + 52.4 |
| % Of Vvpkt Used | 19.19 | 19.19 | 19.19 | 19.19 |
| He Min Clearance % | 17.76 | 17.76 | 17.76 | 17.76 |
| He Tot Clearance % | 28.68 | 28.68 | 28.68 | 28.68 |
| He Vol Eff % | 40.57 | 40.57 | 40.57 | 40.57 |
| Ce Suc Gas Vel Fpm | 8562 | 8562 | 8562 | 8562 |
| Ce Dch Gas Vel Fpm | 8276 | 8276 | 8276 | 8276 |
| Ce Spacrs Used/Max | 0/4 | 0/4 | 0/4 | 0/4 |
| Ce Min Clearance % | 20.73 | 20.73 | 20.73 | 20.73 |
| Ce Tot Clearance % | 20.73 | 20.73 | 20.73 | 20.73 |
| Ce Vol Eff % | 54.94 | 54.94 | 54.94 | 54.94 |
| Suc Pseu-Q He/Ce % | 9.6/8.5 | 9.6/8.5 | 9.6/8.5 | 9.6/8.5 |
| Gas Rod Ld Out # | 34267 C | 34267 C | 34267 C | 34267 C |
| Gas Rod Ld In # | 29968 T | 29968 T | 29968 T | 29968 T |
| Gas Rod Ld Tot # | 64235 | 64235 | 64235 | 64235 |
| Gas Rod Ld Revrsl | Yes | Yes | Yes | Yes |
| Flow Calc Mmscfd | 3.498 | 3.498 | 3.498 | 3.498 |
| Cylinder | 282.8 | 282.8 | 282.8 | 282.8 |

The cylinders have manually adjustable VV pockets. Plate type valves are used. The compressor 104 also includes utility piping with a valve to drain crankcase oil to the edge of the skid 112. Packing vents and drains are also piped to edge of the skid 112. Frame oil piping is installed as required.

The applicable data for the engine 108 is:

| Manufacturer: | CATERPILLAR |
|---|---|
| Model: | 3516TALE |
| Configuration/No. of Cylinders: | V-16 |
| Combustion Type: | Turbo-Charged |
| Compression Ratio: | 8:1 |
| Bore X Stroke: | 6.7 × 7.5 |
| Displacement (cu. inches): | 4210 |
| Speed Range Min/Max: | 900–1400 |
| Continuous BHP @ Mfg. Rating: | 1265 @ 1400 RPM |
| | 1180 @ 1300 RPM |
| | 1085 @ 1200 RPM |
| | 995 @ 1100 RPM |
| Ignition System: | Caterpillar Electronic Ignition System (E.I.S.). |
| Exhaust System: | Residential Grade Muffler Mounted on Top of the Cooler with a Stainless Steel Expansion Joint. |
| Fuel Gas System: | Coalescing Fuel Gas Filter, Block Valve, Fuel Shutoff and Vent Valve, Relief Valve, Pressure Regulators. |
| Starting System: | Ingersoll Rand Starter with Strainer, Pre-Lube, Push Button for Remote Start, Exhaust Piped to Top of Cooler. |
| Emissions: | Nox 2.0 grams, CO 1.9 grams, NMHC 0.44 grams |
| Also Includes: | Turbocharger oil accumulator to lubricate and cool turbo system after shutdown. |

The applicable data for the motor/generator 102 is:

| BRAND: | Teco-Westinghouse |
|---|---|
| BHP: | 1250 |
| RPM: | 1200 |
| PHASE/HZ/VOLTS: | 3/60/4160 |
| INSULATION/S.F.: | F-VPI/1.15 |
| ENCLOSURE: | Class 1, Group D, Div 2 |
| STARTER: | J-C Across the Line Starter |
| INCLUDES: | Class F Insulation, 1.15 S.F. with Class B rise at 1.0 S.F., 60 HZ, Non Sparking for Div. 2 area, 120 Volt Space Heaters, 3300 ft elevation, 40 deg. C. ambient, Standard Engineering Test. Space heaters will be terminated in the motor starter or MCC. Stator and bearing RTD's are included |

The first and second couplings 106 and 110 are Magna-Guard MagnaDrive magnetic clutch couplings that incorporate an overrunning clutch into the driven hub that mounts the motor shaft. In order to use the engine or turbine 108, the engine or turbine 108 is started allowed to warm up at idle speed. The engine or turbine 108 is then sped up to run speed. When the engine or turbine 108 speed becomes faster than the motor/generator 102 speed, the overrunning clutch engages and the engine or turbine 108 becomes the prime mover.

The applicable data for the cooler (not shown) is:

| | | | |
|---|---|---|---|
| Manufacturer: | AIR X CHANGERS | | |
| Model: | 132EH | | |
| Fan Diameter: | 132" | | |
| Fan Tip Speed: | <12,000 FPM | | |

| Sections | Max Working Pressure | Design Temperature Degrees In/Out | Louvers |
|---|---|---|---|
| FJW | 150 PSIG | 195/168 Degrees | |
| TAW | 150 PSIG | 148/130 Degrees | |
| AC | 1100 PSIG | 282/120 Degrees | Manual |

| | |
|---|---|
| Ambient Design Temperature: | 100° F. |
| Design Approach | 200° F. |

Water surge tank complete with gauge glass, vent and fair cap.

| Service | EJW/SLOW | TAW/CLOW | AC |
|---|---|---|---|
| Flow | 264 GPM | 90 GPM | 14.0MMSCFD |
| Fluid | 50% GLY | .50% GLY | .65 SPGR |
| Temperature in, ° F. | 195.0 | 147.8 | 282.0 |
| Temperature out, ° F. | 168.1 | 130.0 | 120.0 |
| Pressure, PSI | | | 960 PSIG |
| Pressure Drop, PSI | 2.5 | 1.3 | 5.9 |
| Heat Load, BTU/HR | 3333837 | 715079 | 2975148 |
| True MTD | 59.0 | 30.3 | 52.8 |
| Overall Rate | 163.5 | 126.3 | 113.6 |
| Foulling Factor | .0005 | .0005 | .0010 |
| Tube Surface, Sq. Ft. | 346 | 191 | 498 |
| Total Surface, Sq. Ft. | 5498 | 3032 | 7913 |
| Sections, No. of Connected | COMBINED SINGLY | COMBINED SINGLY | 1 SINGLY |
| No. Pieces | 1 | 1 | 2 |
| Design Temp., ° F. | 300/−10 | 300/10 | 350/10 |
| Design Press., PSIG | 150 | 150 | 1100 |
| Totl Press., PSIG | 225 | 225 | 1650 |
| Nozzles | 6–150 RF | 3–150 RF | 6–600 RF |
| Tubes, OD × BWO | ⅝ × 16 | ⅝ × 16 | ⅝ × 16 |
| Material | SA214 STEEL | SA214 STEEL | SA214 STEEL |
| No./Sect., Lgth., Ft. | 107.20 | 59.20 | 154.20 |
| No. Rowes | 3 | 3 | 4 |
| Flanges | SA105SCH 40 | SA105SCH 40 | SA105SCH 80 |
| Fins. Type | WHEEL | WHEEL | WHEEL |
| Material | AL | AL | AL |
| Headers, Type | BOX | BOX | BOX |
| Materials | STEEL | STEEL | STEEL |
| Plugs, Type | TAPER | TAPER | SHOULDER |
| Material | BRASS | BRASS | STEEL |
| ASMF, Code Stamp | | | YES |
| Total SCFM 177190 | Temp. to ° F. 100 | Temp Out ° F. 136 | Elev. Ft. 1000 |

The applicable data for the cooler driver (not shown) is:

| | |
|---|---|
| Manufacturer: | ARROW SPECIALTY COMPANY |
| Model: | VRG 330 |
| Configuration/No. of Cylinders: | In-line 6 |
| Combustion Type: | Naturally Aspirated |
| Bore X Stroke: | 3.875/4.665 |
| Displacement (cu. inches): | 330 |
| Speed Range Min/Max: | 900/2200 |
| Continuous BHP @ Mfg. Rating: | 68 @ 1800 RPM |
| | 60 @ 1600 RPM |
| | 52 @ 1400 RPM |
| | 42 @ 1200 RPM |
| Ignition System: | Altronic V non Shielded |
| Exhaust System: | Engine Mounted Muffler |
| Fuel Gas System: | Block Valve, Fuel Shutoff and Vent Valve, Relief Valve, Pressure Regulators. |
| Starting System: | Air/Gas Starter with Strainer. |
| Emissions: | Nox 11.6, CO 14.6, NMHC 0.2 |

The applicable data for the scrubbers (not shown) are:

| | |
|---|---|
| Process: | Suction |
| Diameter: | 30 |
| Sts: | 60 |
| Mawp: | 635 |
| Asme Code: | Yes |
| Internal Design: | Mesh |
| Liquid Level Shutdown: | MURPHY L1200 |
| Liquid Level Controller: | MALLARD 3200 |
| Liquid Level Dump Valve: | MALLARD 5127 |
| Reflex Gauge Glass w/Cocks: | Penberthy Or Equal |
| Drain Piping: | 1" NPT |

Relief valves for discharge and the fuel system are Mercer or Equal—Spring Operated. The relief valve exhaust is piped above cooler. Process piping is built in accordance with ANSI B31.3 Code. Suction and Discharge pulsation bottles are ASME Code Stamped. Scrubber and Pulsation Bottle sizes and working pressures apply to typical design conditions.

The applicable data for the programmed logic controller ("PLC") control panel is:

| Qty | Description | Manufacturer | Part Number |
|---|---|---|---|
| 1 | Chasis, 10-slot | Allen Bradley | 1746-A10 |
| 1 | Power Supply Module | Allen Bradley | 1748-P3 |
| 1 | Processor Module, 16k Mem, DH+ | Allen Bradley | 1747-L641 |
| 1 | EPROM, CPU | Allen Bradley | 1747-M11 |
| 1 | Discrete, 24 V Sink, 16 Input Module | Allen Bradley | 1746-1B16 |
| 1 | Cable, Interface, Module, 16-channel Disctete In | Entrelec | 0027 816.17 |
| 1 | Term, Interface, Module 16-channel Disctete In | Entrelec | 0031 025.05 |
| 1 | Discrete, 24 V Sink, Output Module | Allen Bradley | 1746-0816 |
| 1 | Cable, Interface, 16-channel Disctete Out | Entrelec | 0027 622.15 |
| 1 | Term, Interface, 16-channel Discrete Out | Entrelec | 0031 026.06 |
| 1 | Analog, 4–20 mA, 6 in Module | Allen Bradley | 1745-N15 |
| 1 | Cable, Interface, Module, S-channel Analog In | Entrelec | 0034 702.25 |
| 1 | Term, Inteface, 8-channel Analog In | Entrelec | 0021 062.11 |

-continued

| Qty | Description | Manufacturer | Part Number |
|---|---|---|---|
| 1 | Analog, 4–20 mA, 4 out Module | Allen Bradley | 1746-NO41 |
| 1 | Cable, Interface, Module 4-channel Analog Out | Entrelec | 0027 804.24 |
| 1 | Term, Interface, 4-channel Analog Out | Entrelec | 0021 060.23 |
| 1 | Universal Analog Module, 8 channel | Spectrum | 1748so-NIBu |
| 1 | CAT CCM Module | Caterpillar | 162-8734 |
| 1 | CCM Cable | Caterpillar | 152-0453 |
| 1 | AB CCM Interface Module | Mlille | Omnii-Comm |
| 3 | Modular Cart Slot Filler | Allen Bradley | 1748-N2 |
| 1 | PB, Rod Mushroom, "E8D" | Allen Bradley | 800H-FRXTBAP |
| 1 | Sw, 2-pos | Allen Bradley | 800H-HR2D1P |
| 1 | PanelView 1000, AMBER, 24 Vdc, Keypad, DH+ | Allen Bradley | 2711K10G8L1 |
| 1 | Power Supply, AC to 24 Vdc, 400 Watts | Viaar | VI-PU33-EUU |
| 6 | Fuse Block, Entrelec | Entrelec | 00005918 |
| 5 | Fuse, 6 amp, 3AG | Littlefuse | 00005619 |
| 1 | Fuse, 15 amp, 3AG | Littlefuse | 00004709 |
| 50 | Terminal Blcok, Entrelec, | Entrelec | 00003871 |
| 4 | End Section, Entrelec, | Entrelec | 00003872 |
| 8 | End Stop, Entrelec, | Entrelec | 00003873 |
| 1 | F11, Acromag | Phoenix | 250T-FQ1-DT1 |
| 6 | Relay, 4PDT, CI DIvIl | Square D | 00006291 |
| 6 | Relay, Socket | Square D | 00007488 |
| 1 | Enclosure, 50 × 88 w/Back Panel | FW Murphy Mfr | 50225253 |
| 1 | Base, Enclosure | FW Murphy Mfr | 50225276 |
| 1 | Speed Regulator | FW Murphy Mfr | 05704181 |
| 1 | Speed Gauge | FW Murphy Mfr | 00006482 |
| 7 | Speed Know | FW Murphy Mfr | 00005481 |

Analog Input/Outputs:
  Suction pressure—Rosemount Pressure Transmitter
  Discharge pressure—Rosemount Pressure Transmitter
  Compressor lube oil filter differential pressure—
    Rosemount Pressure Transmitter
RTD'S:
  Motor bearing and stator
  Compressor discharge temperature—each cylinder
  Compressor lube oil temperature
Discret Inputs:
  Compressor oil level low—KENCO LCE-10-FS
  Engine oil level low—KENCO LCE-10-FS
  High vibration—compressor—Murphy VS 2
  High vibration—motor—Murphy VS 2
  High vibration—cooler—Murphy VS 2
  Lubricator no-flow—Whitlock DNFT-LED-PS The skid 112 is a heavy duty oil field type with 3/1 6" checkered floor plate, four main runners and leveling jack screws. Skid members support all vessels and piping, and are provided with pipe ends for skidding and lifting. The skid 112 will be concrete filled under the engine, compressor frame & distance pcs. The skid 112 also includes an environmental drip rail with four drain sumps. The skid 112 has estimated package dimensions of fourteen feet (14') wide by thirty-five feet (35') long and an estimated weight of 125,000 lbs. The cooler has estimated package dimensions of twenty-one feet (21') wide by fifteen feet (15') long and an estimated weight of 20,000 lbs.

Figure 5:
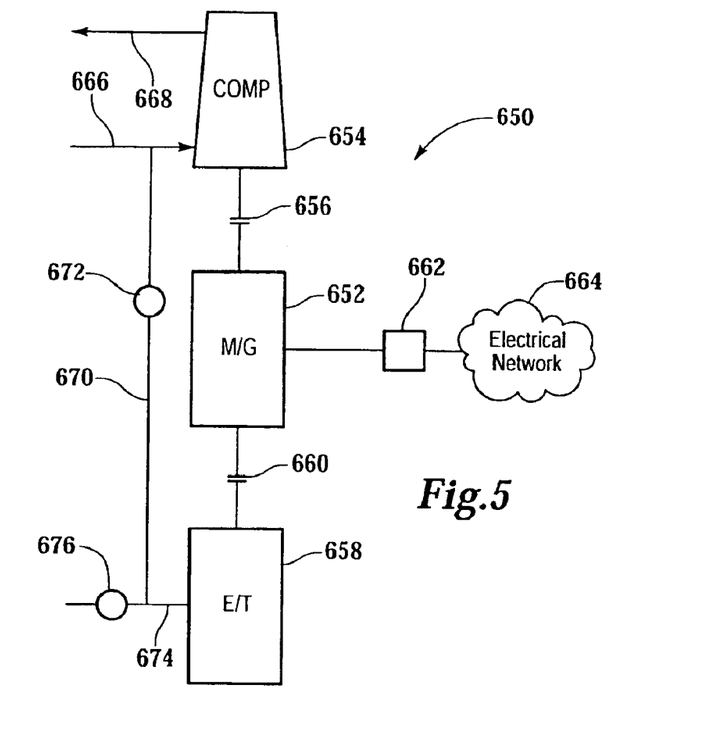
FIG. 5 is a block diagram of a redundant prime mover system in accordance with another embodiment of the present invention.

Now referring to FIG. 5, a block diagram of a redundant prime mover system 650 in accordance with another embodiment of the present invention is shown. The redundant prime mover system 650 includes a motor/generator 652 coupled to a compressor 654 with a first coupling 656 (also referred to as the "M/G-COMP Coupling") and a engine or turbine 658 coupled to the compressor 654 with a second coupling 660 (also referred to as the "E/T-COMP Coupling"). Couplings 656 and 660 can be a clutch, magnetic coupling, gearbox or other suitable device to selectively engage/disengage the shaft of the compressor or pump 654. The engine 658 can be a variable speed engine. In one embodiment of the present invention, the engine 658 is oversized so that some amount of electricity can be generated using the motor/generator 652 even with the compressor 654 is operating at peak load. In small to medium applications, the motor/generator 652, compressor 654 and engine or turbine 658 can be mounted on a skid (not shown) to form a package that can be transported and set up more quickly and economically than individually installing components 652, 654, 656, 658 and 660 in the field. As will be appreciated by those skilled in the art, other equipment (not shown), such as coolers, cooler drivers, scrubbers and application specific devices, may be connected to the motor/generator 652, compressor 654 or engine 658.

The motor/generator 652 is electrically connected to an electrical network connection 662, which is used as a source of electricity to run the motor/generator 652 and drive the compressor 654 and a delivery point for the electricity generated by the motor/generator 652 when the engine 658 is supplying more output power than is required to drive the compressor 654. The exact interface between the electrical network connection 662 and the transmission or distribution system 664 will vary from one installation to another. The electrical network connection 662 may include some of the equipment described in FIG. 1, such as step-down/step-up transformer, breaker or switches.

Although a compressor 654 is depicted, compressor 654 could also be a pump or other machine that is driven by large engines, turbines or motors. Input line 666 and output line 668 are connected to compressor 654. As will be appreciated by those skilled in the art, the connection of the lines 666 and 668 to the compressor 654 will also include various valves, regulators and other flow protection/regulation devices. These lines 666 and 668 may be taps off of a pipeline, such as natural gas or other petroleum product, or part of a processing plant. If input line 666 contains a product that can be used as fuel for the engine or turbine 658, a first fuel supply line 670 having a regulating valve 672 will connect the input line 666 to the engine or turbine 658. In such cases, first fuel supply line 670 will serve as the primary fuel supply for the engine or turbine 658. A second fuel supply line 674 having a regulating valve 676 will typically connect the engine or turbine 658 to an alternate fuel supply. If input line 666 does not contains a product that can be used as fuel for the engine or turbine 658, second fuel supply line 674 will be the primary source of fuel to the engine or turbine 658.

Figure 6:
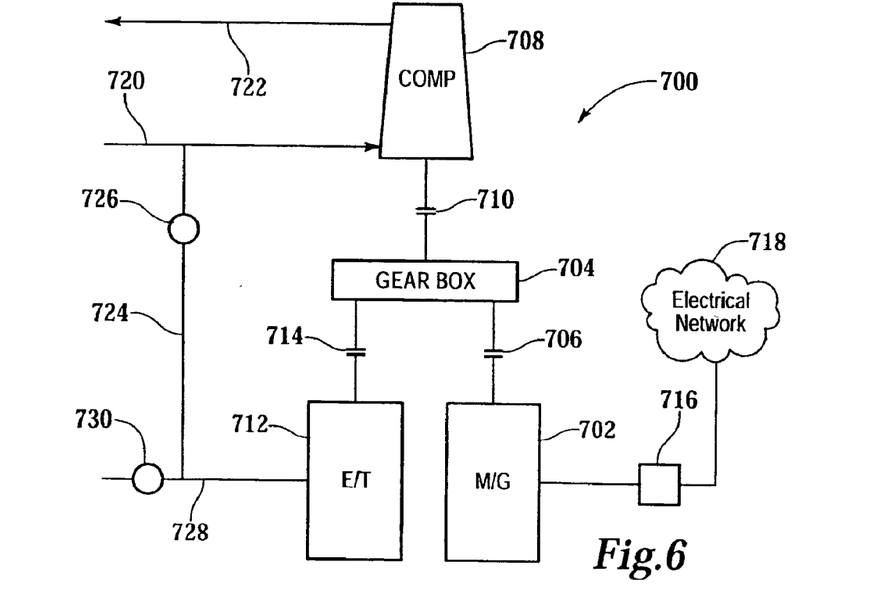
FIG. 6 is a block diagram of a redundant prime mover system in accordance with another embodiment of the present invention.

Referring now to FIG. 6, a block diagram of a redundant prime mover system 700 in accordance with another embodiment of the present invention is shown. The redundant prime mover system 700 includes a motor/generator 702 coupled to a gearbox 704 with a first coupling 706 (also referred to as the "M/G-COMP Coupling"), a compressor 708 coupled to the gearbox 704 with a third coupling 710 and a engine or turbine 712 coupled to the gearbox 704 with a second coupling 714 (also referred to as the "E/T-COMP Coupling"). Couplings 706, 710 and 714 can be a clutch, magnetic coupling, gearbox or other suitable device to selectively engage/disengage the shaft of the motor/generator 706, compressor or pump 708 and engine or turbine 712. The engine 712 can be a variable speed engine. In one embodiment of the present invention, the engine 712 is oversized so that some amount of electricity can be generated using the motor/generator 702 even with the compressor 708 is operating at peak load. In small to medium applications, the motor/generator 702, gearbox 704, compressor 708 and engine or turbine 712 can be mounted on a skid (not shown) to form a package that can be transported and set up more quickly and economically than individually installing components 702, 704, 706, 708, 710, 712 and 714 in the field. As will be appreciated by those skilled in the art, other equipment (not shown), such as coolers, cooler drivers, scrubbers and application specific devices, may be connected to the motor/generator 702, gearbox 704, compressor 708 and engine or turbine 712.

The motor/generator 702 is electrically connected to an electrical network connection 716, which is used as a source of electricity to run the motor/generator 702 and drive the compressor 708 and a delivery point for the electricity generated by the motor/generator 702 when the engine 714 is supplying more output power than is required to drive the compressor 708. The exact interface between the electrical network connection 716 and the transmission or distribution system 718 will vary from one installation to another. The electrical network connection 716 may include some of the equipment described in FIG. 1, such as step-down/step-up transformer, breaker or switches.

Although a compressor 708 is depicted, compressor 708 could also be a pump or other machine that is driven by large engines, turbines or motors. Input line 720 and output line 722 are connected to compressor 708. As will be appreciated by those skilled in the art, the connection of the lines 720 and 722 to the compressor 708 will also include various valves, regulators and other flow protection/regulation devices. These lines 720 and 722 may be taps off of a pipeline, such as natural gas or other petroleum product, or part of a processing plant. If input line 720 contains a product that can be used as fuel for the engine or turbine 712, a first fuel supply line 724 having a regulating valve 726 will connect the input line 720 to the engine or turbine 712. In such cases, first fuel supply line 724 will serve as the primary fuel supply for the engine or turbine 712. A second fuel supply line 728 having a regulating valve 730 will typically connect the engine or turbine 712 to an alternate fuel supply. If input line 720 does not contains a product that can be used as fuel for the engine or turbine 712, second fuel supply line 728 will be the primary source of fuel to the engine or turbine 712.

Although preferred embodiments of the present invention have been described in detail, it will be understood by those skilled in the art that various modifications can be made therein without departing from the spirit and scope of the invention as set forth in the appended claims.

What is claimed is:

1. A redundant prime mover system to drive a machine comprising:
   an engine coupled to the machine;
   a motor/generator coupled to the machine and an electrical network connection; and
   a controller communicably coupled to the engine and the motor/generator, the controller having at least three operating modes including a first operating mode comprising the engine driving the machine, a second operating mode comprising the motor/generator driving the machine, and a third operating mode comprising the engine driving the machine and the motor/generator such that the motor/generator generates electricity for delivery to the electrical network connection, wherein the controller selects the first operating mode whenever a first estimated operational cost for the engine is less than an estimated operational cost for the motor/generator, the second operating mode whenever an estimated operational cost for the motor/generator is less than or equal to the first estimated operational cost for the engine, and the third operating mode whenever a selling price for the electricity is greater than the second estimated operational cost for the engine.

2. The system as recited in claim 1, wherein the machine is a compressor.

3. The system as recited in claim 1, wherein the machine is a pump.

4. The system as recited in claim 1, wherein the engine is a turbine.

5. The system as recited in claim 1, wherein the engine is a variable speed engine.

6. The system as recited in claim 1, wherein the engine is a coupled to the machine with a clutch.

7. The system as recited in claim 1, wherein the engine is a coupled to the machine with a magnetic coupling.

8. The system as recited in claim 1, wherein the motor/generator is a coupled to the machine with a clutch.

9. The system as recited in claim 1, wherein the motor/generator is a coupled to the machine with a magnetic coupling.

10. The system as recited in claim 1, wherein the engine is a coupled to the machine with a gearbox and the motor/generator is a coupled to the machine with the gearbox.

11. The system as recited in claim 1, further comprising a skid wherein the engine, the motor/generator and the machine are mounted on the skid.

12. The system as recited in claim 1, wherein the controller further includes a fourth operating mode comprising both the engine and the motor/generator driving the machine.

13. The system as recited in claim 1, wherein the controller is manually operated.

14. The system as recited in claim 1, wherein the controller is a programmed logic controller.

15. The system as recited in claim 1, wherein the controller is a computer.

16. The system as recited in claim 1, wherein the controller comprises:
    a processor;
    a memory communicably coupled to the processor;
    an engine control interface communicably coupled to the processor and the engine; and
    a motor/generator control interface communicably coupled to the processor and the motor/generator.

17. The system as recited in claim 1, wherein the controller selects one of the operating modes based on one or more parameters.

18. The system as recited in claim 17, wherein the one or more parameters include an estimated operational cost for the engine.

19. The system as recited in claim 17, wherein the one or more parameters include an estimated operational cost for the motor/generator.

20. The system as recited in claim 17, wherein the one or more parameters include a selling price for electricity.

21. The system as recited in claim 17, wherein the one or more parameters include a fuel cost for the engine.

22. The system as recited in claim 17, wherein the one or more parameters include an electricity cost for the motor/generator.

23. The system as recited in claim 17, wherein the one or more parameters include a time period.

24. The system as recited in claim 17, wherein the one or more parameters include an emission limit.

25. The system as recited in claim 17, wherein the one or more parameters include an audible noise limit.

26. A redundant prime mover system to drive a machine comprising:
an engine coupled to the machine;
a motor/generator coupled to the machine; and
a controller communicably coupled to the engine and the motor/generator, the controller having at least three operating modes including a first operating mode comprising the engine driving the machine, a second operating mode comprising the motor/generator driving the machine, and a third operating mode comprising both the engine and the motor/generator driving the machine, wherein the controller selects the first operating mode whenever a first estimated operational cost for the engine is less than an estimated operational cost for the motor/generator, the second operating mode whenever an estimated operational cost for the motor/generator is less than or equal to the first estimated operational cost for the engine, and the third operating mode whenever load sharing is selected.

27. The system as recited in claim 26, wherein the machine is a compressor.

28. The system as recited in claim 26, wherein the machine is a pump.

29. The system as recited in claim 26, wherein the engine is a turbine.

30. The system as recited in claim 26, wherein the engine is a variable speed engine.

31. The system as recited in claim 26, wherein the engine is a coupled to the machine with a clutch.

32. The system as recited in claim 26, wherein the engine is a coupled to the machine with a magnetic coupling.

33. The system as recited in claim 26, wherein the motor/generator is a coupled to the machine with a clutch.

34. The system as recited in claim 26, wherein the motor/generator is a coupled to the machine with a magnetic coupling.

35. The system as recited in claim 26, wherein the engine is a coupled to the machine with a gearbox and the motor/generator is a coupled to the machine with the gearbox.

36. The system as recited in claim 26, further comprising a skid wherein the engine, the motor/generator and the machine are mounted on the skid.

37. The system as recited in claim 26, further comprising:
an electrical network connection coupled to the motor/generator; and
the controller further includes a fourth operating mode comprising the engine driving the machine and the motor/generator such that the motor/generator generates electricity for delivery to the electrical network connection.

38. The system as recited in claim 26, wherein the controller is manually operated.

39. The system as recited in claim 26, wherein the controller is a programmed logic controller.

40. The system as recited in claim 26, wherein the controller is a computer.

41. The system as recited in claim 26, wherein the controller comprises:
a processor;
a memory communicably coupled to the processor;
an engine control interface communicably coupled to the processor and the engine; and
a motor/generator control interface communicably coupled to the processor and the motor/generator.

42. The system as recited in claim 26, wherein the controller selects one of the operating modes based on one or more parameters.

43. The system as recited in claim 42, wherein the one or more parameters include an estimated operational cost for the engine.

44. The system as recited in claim 42, wherein the one or more parameters include an estimated operational cost for the motor/generator.

45. The system as recited in claim 42, wherein the one or more parameters include a selling price for electricity.

46. The system as recited in claim 42, wherein the one or more parameters include a fuel cost for the engine.

47. The system as recited in claim 42, wherein the one or more parameters include an electricity cost for the motor/generator.

48. The system as recited in claim 42, wherein the one or more parameters include a time period.

49. The system as recited in claim 42, wherein the one or more parameters include an emission limit.

50. The system as recited in claim 42, wherein the one or more parameters include an audible noise limit.

51. The redundant prime mover system to drive a machine comprising:
a motor/generator coupled to the machine and an electrical network connection;
an engine coupled to the motor/generator; and
a controller communicably coupled to the engine and the motor/generator, the controller having at least three operating modes including a first operating mode comprising the engine driving the machine, a second operating mode comprising the motor/generator driving the machine, and a third operating mode comprising the engine driving the machine and the motor/generator such that the motor/generator generates electricity for delivery to the electrical network connection, wherein the controller selects the first operating mode whenever a first estimated operational cost for the engine is less than an estimated operational cost for the motor/generator, the second operating mode whenever an estimated operational cost for the motor/generator is less than or equal to the first estimated operational cost for the engine, and the third operating mode whenever a selling price for the electricity is greater than the second estimated operational cost for the engine.

52. The system as recited in claim 51, wherein the machine is a compressor.

53. The system as recited in claim 51, wherein the machine is a pump.

54. The system as recited in claim 51, wherein the engine is a turbine.

55. The system as recited in claim 51, wherein the engine is a variable speed engine.

56. The system as recited in claim 51, wherein the engine is a coupled to the motor/generator with a clutch.

57. The system as recited in claim 51, wherein the engine is a coupled to the motor/generator with a magnetic coupling.

58. The system as recited in claim 51, wherein the motor/generator is a coupled to the machine with a clutch.

59. The system as recited in claim 51, wherein the motor/generator is a coupled to the machine with a magnetic coupling.

60. The system as recited in claim 51, further comprising a skid wherein the engine, the motor/generator and the machine are mounted on the skid.

61. The system as recited in claim 51, wherein the controller further includes a fourth operating mode comprising both the engine and the motor/generator driving the machine.

62. The system as recited in claim 51, wherein the controller is manually operated.

63. The system as recited in claim 51, wherein the controller is a programmed logic controller.

64. The system as recited in claim 51, wherein the controller is a computer.

65. The system as recited in claim 51, wherein the controller comprises:

a processor;

a memory communicably coupled to the processor;

an engine control interface communicably coupled to the processor and the engine; and a motor/generator control interface communicably coupled to the processor and the motor/generator.

66. The system as recited in claim 51, wherein the controller selects one of the operating modes based on one or more parameters.

67. The system as recited in claim 66, wherein the one or more parameters include an estimated operational cost for the engine.

68. The system as recited in claim 66, wherein the one or more parameters include an estimated operational cost for the motor/generator.

69. The system as recited in claim 66, wherein the one or more parameters include a selling price for electricity.

70. The system as recited in claim 66, wherein the one or more parameters include a fuel cost for the engine.

71. The system as recited in claim 66, wherein the one or more parameters include an electricity cost for the motor/generator.

72. The system as recited in claim 66, wherein the one or more parameters include a time period.

73. The system as recited in claim 66, wherein the one or more parameters include an emission limit.

74. The system as recited in claim 66, wherein the one or more parameters include an audible noise limit.

75. A redundant prime mover system to drive a machine comprising:

a motor/generator coupled to the machine;

an engine coupled to the motor/generator; and a controller communicably coupled to the engine and the motor/generator, the controller having at least three operating modes including a first operating mode comprising the engine driving the machine, a second operating mode comprising the motor generator driving the machine, and a third operating mode comprising both the engine and the motor/generator driving the machine, wherein the controller selects the first operating mode whenever a first estimated operational cost for the engine is less than an estimated operational cost for the motor/generator, the second operating mode whenever an estimated operational cost for the motor/generator is less than or equal to the first estimated operational cost for the engine, and the third operating mode whenever load sharing is selected.

76. The system as recited in claim 75, wherein the machine is a compressor.

77. The system as recited in claim 75, wherein the machine is a pump.

78. The system as recited in claim 75, wherein the engine is a turbine.

79. The system as recited in claim 75, wherein the engine is a variable speed engine.

80. The system as recited in claim 75, wherein the engine is a coupled to the machine with a clutch.

81. The system as recited in claim 75, wherein the engine is a coupled to the machine with a magnetic coupling.

82. The system as recited in claim 75, wherein the motor/generator is a coupled to the machine with a clutch.

83. The system as recited in claim 75, wherein the motor/generator is a coupled to the machine with a magnetic coupling.

84. The system as recited in claim 75, wherein the engine is a coupled to the machine with a gearbox and the motor/generator is a coupled to the machine with the gearbox.

85. The system as recited in claim 75, further comprising a skid wherein the engine, the motor/generator and the machine are mounted on the skid.

86. The system as recited in claim 75, further comprising:

an electrical network connection coupled to the motor/generator; and the controller further including a fourth operating mode comprising the engine driving the machine and the motor/generator such that the motor/generator generates electricity for delivery to the electrical network connection.

87. The system as recited in claim 75, wherein the controller is manually operated.

88. The system as recited in claim 75, wherein the controller is a programmed logic controller.

89. The system as recited in claim 75, wherein the controller is a computer.

90. The system as recited in claim 75, wherein the controller comprises:

a processor;

a memory communicably coupled to the processor;

an engine control interface communicably coupled to the processor and the engine; and a motor/generator control interface communicably coupled to the processor and the motor/generator.

91. The system as recited in claim 75, wherein the controller selects one of the operating modes based on one or more parameters.

92. The system as recited in claim 91, wherein the one or more parameters include an estimated operational cost for the engine.

93. The system as recited in claim 91, wherein the one or more parameters include an estimated operational cost for the motor/generator.

94. The system as recited in claim 91, wherein the one or more parameters include a selling price for electricity.

95. The system as recited in claim 91, wherein the one or more parameters include a fuel cost for the engine.

96. The system as recited in claim 91, wherein the one or more parameters include an electricity cost for the motor/generator.

97. The system as recited in claim 91, wherein the one or more parameters include a time period.

98. The system as recited in claim 91, wherein the one or more parameters include an emission limit.

99. The system as recited in claim 91, wherein the one or more parameters include an audible noise limit.

* * * * *